(12) United States Patent
Showering

(10) Patent No.: US 9,258,033 B2
(45) Date of Patent: Feb. 9, 2016

(54) DOCKING SYSTEM AND METHOD USING NEAR FIELD COMMUNICATION

(71) Applicant: Hand Held Products, Inc., Fort Mill, SC (US)

(72) Inventor: Paul Edward Showering, Chippenham (GB)

(73) Assignee: Hand Held Products, Inc., Fort Mill, SC (US)

( * ) Notice: Subject to any disclaimer, the term of this patent is extended or adjusted under 35 U.S.C. 154(b) by 77 days.

(21) Appl. No.: 14/257,364

(22) Filed: Apr. 21, 2014

(65) Prior Publication Data

US 2015/0303993 A1 Oct. 22, 2015

(51) Int. Cl.
| | |
|---|---|
| *G06F 1/16* | (2006.01) |
| *H04B 5/00* | (2006.01) |
| *H04M 1/04* | (2006.01) |
| *H04M 1/725* | (2006.01) |
| *H04W 12/06* | (2009.01) |
| *H04W 4/00* | (2009.01) |

(52) U.S. Cl.
CPC ............ *H04B 5/0031* (2013.01); *G06F 1/1632* (2013.01); *H04M 1/04* (2013.01); *H04M 1/7253* (2013.01); *H04W 4/008* (2013.01); *H04W 12/06* (2013.01)

(58) Field of Classification Search
CPC ..................................................... G06F 1/1632
See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 14/274,858 for Mobile Printer With Optional Battery Accessory, filed May 12, 2014, (Marty et al.), 26 pages.

(Continued)

*Primary Examiner* — David Bilodeau
(74) *Attorney, Agent, or Firm* — Additon, Higgins & Pendleton, P.A.

(57) ABSTRACT

A method and system for configuring a mobile computing device to a docking station using near field communication is disclosed. A mobile computing device may scan an NFC tag integrated with the docking station to gather docking-station information. This docking-station information may be used by the mobile computing device to (i) configure its interface connector to match the docking connector, (ii) establish a communication link with the docking station and/or a host computer connected to the docking station, or (iii) authenticate the docking station to the mobile computing device or vice versa.

18 Claims, 3 Drawing Sheets

(56) References Cited

U.S. PATENT DOCUMENTS

| | | | |
|---|---|---|---|
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Caballero | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 2006/0212679 A1* | 9/2006 | Alfano | G06F 1/08 712/38 |
| 2007/0063048 A1 | 3/2007 | Havens et al. | |
| 2008/0185432 A1 | 8/2008 | Caballero et al. | |
| 2009/0095804 A1 | 4/2009 | Agevik et al. | |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0169999 A1 | 7/2011 | Grunow et al. | |
| 2011/0202554 A1 | 8/2011 | Powilleit et al. | |
| 2012/0111946 A1 | 5/2012 | Golant | |
| 2012/0138685 A1 | 6/2012 | Qu et al. | |
| 2012/0168511 A1 | 7/2012 | Kotlarsky et al. | |
| 2012/0168512 A1 | 7/2012 | Kotlarsky et al. | |
| 2012/0193407 A1 | 8/2012 | Barten | |
| 2012/0193423 A1 | 8/2012 | Samek | |
| 2012/0203647 A1 | 8/2012 | Smith | |
| 2012/0223141 A1 | 9/2012 | Good et al. | |
| 2012/0228382 A1 | 9/2012 | Havens et al. | |
| 2012/0248188 A1 | 10/2012 | Kearney | |
| 2012/0282858 A1* | 11/2012 | Gill | G06F 1/1632 455/41.1 |
| 2013/0043312 A1 | 2/2013 | Van Horn | |
| 2013/0054390 A1 | 2/2013 | Kerchner et al. | |
| 2013/0056285 A1 | 3/2013 | Meagher | |
| 2013/0070322 A1 | 3/2013 | Fritz et al. | |
| 2013/0075168 A1 | 3/2013 | Amundsen et al. | |
| 2013/0082104 A1 | 4/2013 | Kearney et al. | |
| 2013/0175341 A1 | 7/2013 | Kearney et al. | |
| 2013/0175343 A1 | 7/2013 | Good | |
| 2013/0200158 A1 | 8/2013 | Feng et al. | |
| 2013/0214048 A1 | 8/2013 | Wilz | |
| 2013/0256418 A1 | 10/2013 | Havens et al. | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0278425 A1 | 10/2013 | Cunningham et al. | |
| 2013/0287258 A1 | 10/2013 | Kearney | |
| 2013/0292474 A1 | 11/2013 | Xian et al. | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0297844 A1 | 11/2013 | Rosenberg et al. | |
| 2013/0306728 A1 | 11/2013 | Thuries et al. | |
| 2013/0306730 A1 | 11/2013 | Brady et al. | |
| 2013/0306731 A1 | 11/2013 | Pedraro | |
| 2013/0306734 A1 | 11/2013 | Xian et al. | |
| 2013/0307964 A1 | 11/2013 | Bremer et al. | |
| 2013/0308625 A1 | 11/2013 | Corcoran | |
| 2013/0313324 A1 | 11/2013 | Koziol et al. | |
| 2013/0313325 A1 | 11/2013 | Wilz et al. | |
| 2013/0313326 A1 | 11/2013 | Ehrhart | |
| 2013/0327834 A1 | 12/2013 | Hennick et al. | |
| 2013/0341399 A1 | 12/2013 | Xian et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008430 A1 | 1/2014 | Soule et al. | |
| 2014/0008439 A1 | 1/2014 | Wang | |
| 2014/0021256 A1 | 1/2014 | Qu et al. | |
| 2014/0025584 A1 | 1/2014 | Liu et al. | |
| 2014/0027518 A1 | 1/2014 | Edmonds et al. | |
| 2014/0034723 A1 | 2/2014 | Van Horn et al. | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0042814 A1 | 2/2014 | Kather et al. | |
| 2014/0049120 A1 | 2/2014 | Kohtz et al. | |

(56) References Cited

U.S. PATENT DOCUMENTS

| | | | |
|---|---|---|---|
| 2014/0049635 | A1 | 2/2014 | Laffargue et al. |
| 2014/0061305 | A1 | 3/2014 | Nahill et al. |
| 2014/0061306 | A1 | 3/2014 | Wu et al. |
| 2014/0061307 | A1 | 3/2014 | Wang et al. |
| 2014/0063289 | A1 | 3/2014 | Hussey et al. |
| 2014/0066136 | A1 | 3/2014 | Sauerwein et al. |
| 2014/0067692 | A1 | 3/2014 | Ye et al. |
| 2014/0070005 | A1 | 3/2014 | Nahill et al. |
| 2014/0071840 | A1 | 3/2014 | Venancio |
| 2014/0074746 | A1 | 3/2014 | Wang |
| 2014/0075846 | A1 | 3/2014 | Woodburn |
| 2014/0076974 | A1 | 3/2014 | Havens et al. |
| 2014/0078341 | A1 | 3/2014 | Havens et al. |
| 2014/0078342 | A1 | 3/2014 | Li et al. |
| 2014/0078345 | A1 | 3/2014 | Showering |
| 2014/0084068 | A1 | 3/2014 | Gillet et al. |
| 2014/0086348 | A1 | 3/2014 | Peake et al. |
| 2014/0097249 | A1 | 4/2014 | Gomez et al. |
| 2014/0098284 | A1 | 4/2014 | Oberpriller et al. |
| 2014/0098792 | A1 | 4/2014 | Wang et al. |
| 2014/0100774 | A1 | 4/2014 | Showering |
| 2014/0100813 | A1 | 4/2014 | Showering |
| 2014/0103115 | A1 | 4/2014 | Meier et al. |
| 2014/0104413 | A1 | 4/2014 | Mccloskey et al. |
| 2014/0104414 | A1 | 4/2014 | McCloskey et al. |
| 2014/0104416 | A1 | 4/2014 | Li et al. |
| 2014/0104451 | A1 | 4/2014 | Todeschini et al. |
| 2014/0106594 | A1 | 4/2014 | Skvoretz |
| 2014/0106725 | A1 | 4/2014 | Sauerwein |
| 2014/0108010 | A1 | 4/2014 | Maltseff et al. |
| 2014/0108402 | A1 | 4/2014 | Gomez et al. |
| 2014/0108682 | A1 | 4/2014 | Caballero |
| 2014/0110485 | A1 | 4/2014 | Toa et al. |
| 2014/0114530 | A1 | 4/2014 | Fitch et al. |
| 2014/0121438 | A1 | 5/2014 | Kearney |
| 2014/0121445 | A1 | 5/2014 | Ding et al. |
| 2014/0124577 | A1 | 5/2014 | Wang et al. |
| 2014/0124579 | A1 | 5/2014 | Ding |
| 2014/0125842 | A1 | 5/2014 | Winegar |
| 2014/0125853 | A1 | 5/2014 | Wang |
| 2014/0125999 | A1 | 5/2014 | Longacre et al. |
| 2014/0129378 | A1 | 5/2014 | Richardson |
| 2014/0131441 | A1 | 5/2014 | Nahill et al. |
| 2014/0133379 | A1 | 5/2014 | Wang et al. |
| 2014/0140585 | A1 | 5/2014 | Wang |
| 2014/0151453 | A1 | 6/2014 | Meier et al. |
| 2014/0160329 | A1 | 6/2014 | Ren et al. |
| 2015/0046624 | A1* | 2/2015 | Ramirez ............... G06F 13/409 710/303 |
| 2015/0192917 | A1* | 7/2015 | Rajakarunanayake . G05B 19/041 700/95 |

OTHER PUBLICATIONS

U.S. Appl. No. 14/264,173 for Autofocus Lens System for Indicia Readers filed Apr. 29, 2014, (Ackley et al.), 39 pages.

U.S. Appl. No. 14/230,322 for Focus Module and Components with Actuator filed Mar. 31, 2014 (Feng et al.); 92 pages.

U.S. Appl. No. 14/222,994 for Method and Apparatus for Reading Optical Indicia Using a Plurality of Data filed Mar. 24, 2014 (Smith et al.); 30 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

U.S. Appl. No. 13/367,978, filed Feb. 7, 2012, (Feng et al.); now abandoned.

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

(56) References Cited

OTHER PUBLICATIONS

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

U.S. Appl. No. 14/257,174 for Reading Apparatus Having Partial Frame Operating Mode filed Apr. 21, 2014, (Barber et al.), 67 pages.

U.S. Appl. No. 14/200,405 for Indicia Reader for Size-Limited Applications filed Mar. 7, 2014 (Feng et al.); 42 pages.

U.S. Appl. No. 14/166,103 for Indicia Reading Terminal Including Optical Filter filed Jan. 28, 2014 (Lu et al.); 29 pages.

Combined Search and Examination Report in counterpart United Kingdom Application No. GB1505929.8 dated Sep. 28, 2015, pp. 1-6.

* cited by examiner

DOCKING SYSTEM AND METHOD USING NEAR FIELD COMMUNICATION

FIELD OF THE INVENTION

The present invention relates to the field of near field communication (NFC) systems and, more specifically, to a docking system for a mobile-computing device using near field communication.

BACKGROUND

Generally speaking, docking stations (i.e., docks) may provide a single docking connector to charge batteries, access data, and communicate with a host computer and/or peripherals. For a given family of mobile computing devices with similar dimensions and physical electrical connection characteristics, there may be several different types of compatible docking stations available from a manufacturer. These docking stations may have different characteristics. For example, the interface on these docks may be configured for RS-232, USB, ethernet, or audio. Some docking stations may provide power for charging, while others do not.

A mobile computing device that can dock with various types of docking stations is highly desirable. One approach to this problem is to employ a general purpose connector suitable for a variety of docking stations. If the pins/pads of the mobile device's connector are not configurable, then a large connector would be necessary to match the various docking scenarios. Since space on a mobile computing device is limited, there is a strong preference to reduce the number of electrical connections on the interface connection used for docking. A reconfigurable docking interface would allow the docking of a mobile computing device with various docking stations both in the market and yet to be developed.

Therefore, a need exists for a method and system to allow a mobile computing device to dock with various types of docking stations.

SUMMARY

Accordingly, in one aspect, the present invention embraces a method for docking an NFC-enabled mobile computing device with an NFC-enabled docking station. The method is embodied by (i) placing an NFC-enabled mobile computing device in proximity to an NFC-enabled docking station, (ii) transferring docking-station information from the NFC-enabled docking station to the NFC-enabled mobile computing device using NFC communication, (iii) configuring the NFC-enabled mobile computing device based on the received docking-station information, and (iv) connecting an interface connector on the NFC-enabled mobile computing device with a docking connector on the NFC-enabled docking station.

In an exemplary embodiment, an NFC-enabled docking station with an NFC tag is scanned by the NFC-enabled mobile computing device to transfer the docking-station information.

In another exemplary embodiment, the NFC-enabled mobile computing device's interface connector is configured to electrically match the NFC-enabled docking station's docking connector.

In yet another exemplary embodiment, the docking-station information configures the NFC-enabled mobile computing device to establish a communication link with the NFC-enabled docking station.

In another exemplary embodiment, the docking-station information configures the NFC-enabled mobile computing device to establish a communication link with a host computer connected to the NFC-enabled docking station.

In still another exemplary embodiment, the docking-station information configures the NFC-enabled mobile computing device to establish a communication link with the NFC-enabled docking station and a host computer that is connected to the NFC-enabled docking station.

In another exemplary embodiment, the step of transferring docking-station information is initiated when the NFC-enabled mobile computing device detects a docking condition.

In yet another exemplary embodiment, the docking-station information includes docking-station authentication credentials.

In another exemplary embodiment, the docking station authentication credentials are used to establish a communication link between the NFC-enabled mobile computing device and the NFC-enabled docking station and/or a host computer connected to the NFC-enabled docking station.

In another aspect, the present invention embraces a near field communication (i.e., NFC) docking system. The system includes an NFC-enabled mobile computing device that is configured to acquire information from another NFC-enabled device. The system also includes an NFC-enabled docking station with docking-station information. The system is configured to transfer this docking-station information to another NFC-enabled device. The near field communication docking system uses the docking-station information to configure the NFC-enabled mobile computing device when it is positioned in proximity to the NFC-enabled docking station.

In an exemplary embodiment, the NFC docking system's NFC-enabled docking station includes an NFC tag that facilitates the transfer of the docking-station information from the NFC-enabled docking station to the NFC-enabled mobile computing device.

In another exemplary embodiment, the NFC docking system uses the docking-station information to configure an interface connector on the NFC-enabled mobile computing device to electrically match a docking connector on the NFC-enabled docking station.

In yet another exemplary embodiment, the NFC docking system uses the docking-station information to configure the NFC-enabled mobile computing device to establish a communication link with the NFC-enabled docking station.

In another exemplary embodiment, the NFC docking system uses the docking-station information to configure the NFC-enabled mobile computing device to establish a communication link with a host computer connected to the NFC-enabled docking station.

In still another exemplary embodiment, the NFC docking system uses the docking-station information to configure the NFC-enabled mobile computing device to establish a communication link with the NFC-enabled docking station and a host computer connected to the NFC-enabled docking station.

In another exemplary embodiment, The NFC docking system's NFC-enabled mobile computing device is configured to acquire information from the NFC-enabled docking station when the NFC-enabled mobile computing device detects a docking condition.

In yet another exemplary embodiment, The NFC docking system's docking-station information includes docking station authentication credentials.

In another exemplary embodiment, the NFC docking system uses the docking station authentication credentials to establish a communication link between the NFC-enabled mobile computing device and the NFC-enabled docking station and/or a host computer connected to the NFC-enabled docking station.

In another exemplary embodiment, the NFC-enabled mobile computing device is configured to provide a key code to the NFC-enabled docking station in order to initiate transfer of the docking-station information from the NFC-enabled docking station to the NFC-enabled mobile computing device.

In another exemplary embodiment, the NFC docking system uses encrypted docking-station information to configure the NFC-enabled mobile computing device.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a near field communication (i.e., NFC) docking system. The system includes an NFC-enabled mobile computing device (e.g., mobile device) configured to acquire information about an NFC-enabled docking station when the mobile computing device is located close (e.g., attached) to the docking station. The mobile computing device uses this docking-station information to configure one or more of its aspects to facilitate docking and communication with the docking station and/or a host computer connected to the docking station.

Near field communication is a short range high frequency wireless communication technology. The parameters for this communication standard are detailed in a four part International Organization for Standardization (i.e., ISO) and International Electro-technical Commission (i.e., IEC) standard. These standards are ISO/IEC 14443-1:2008, ISO/IEC 14443-2:2010, ISO/IEC 14443-3:2011, and ISO/IEC 14443-4:2008 and are each hereby incorporated by reference.

NFC is primarily intended for use by mobile devices. The range for this communication is modest (e.g., 10 centimeters or less), and the user typically initiates the data exchange. It is meant for applications where a physical touch, or close to it, is required. In this way, NFC communication is secure and intentional. The amount of data communicated is limited but sufficient for most NFC applications.

NFC may be used to configure a mobile device's software settings. For example an NFC communication system in an automobile could be used to configure a user's cell phone to operate optimally with the vehicle's sound and navigation systems.

NFC communication may occur between two active (i.e., self powered) NFC enabled devices, such as between two cell phones. It can also exist between an active NFC device (i.e., mobile computing device) and a passive (i.e., not self powered) NFC device known as an NFC tag.

Figure 1:
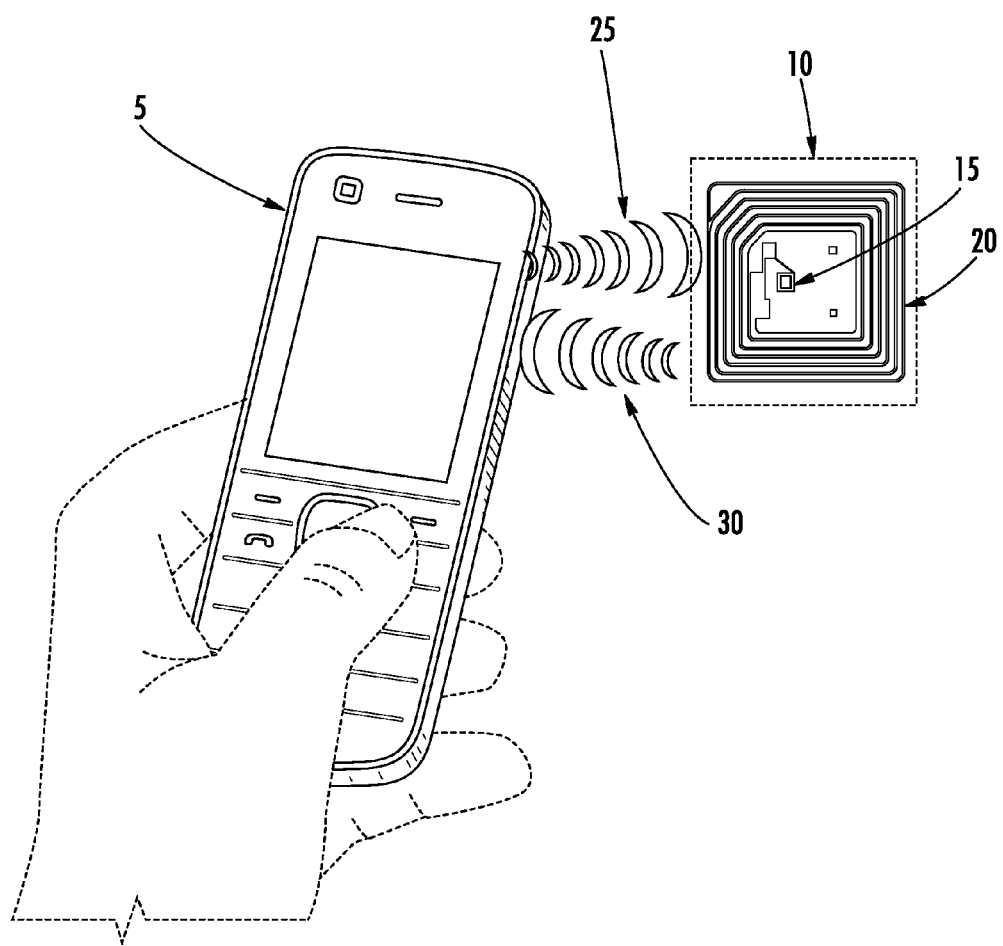
FIG. 1 graphically depicts a near field communication system.

As shown in FIG. 1, an NFC communication system includes a reader 5 and an NFC tag (i.e., tag) 10. The simplest type of tag 10 includes a memory 15 and an antenna 20 to communicate the stored data wirelessly when it is read (i.e., scanned). These simple tags 10 operate in two modes: read and write. The reading process starts when an NFC-enabled mobile computing device (i.e., reader) 5 is located in proximity (e.g., within 10 cm) to an NFC tag 10. The user initiates communication, typically through some interface on the reader 5. Upon initiation, the reader 5 emits a high frequency scan signal (e.g., 13.56 megahertz) 25 and simultaneously listens for characteristic information signals 30 from the NFC tag 10. The NFC tag 10 receives the scan signal 25 from the reader 5 and uses a portion of the scan signal's energy as its power source. The tag 10, powered by this energy, radiates a information signal 30 back to the reader, this information signal 30 being modulated by the data stored in the NFC tag's memory. The reader 5 receives and demodulates this information signal 30 to acquire the information from the NFC tag 10.

The amount of information stored in the NFC tag's memory 15 depends on the type of tag. A tag may be encoded (i.e., written to) by an active NFC enabled device configured to write. Some tags may be encoded only once, while others may be encoded with new information many times.

Figure 2:
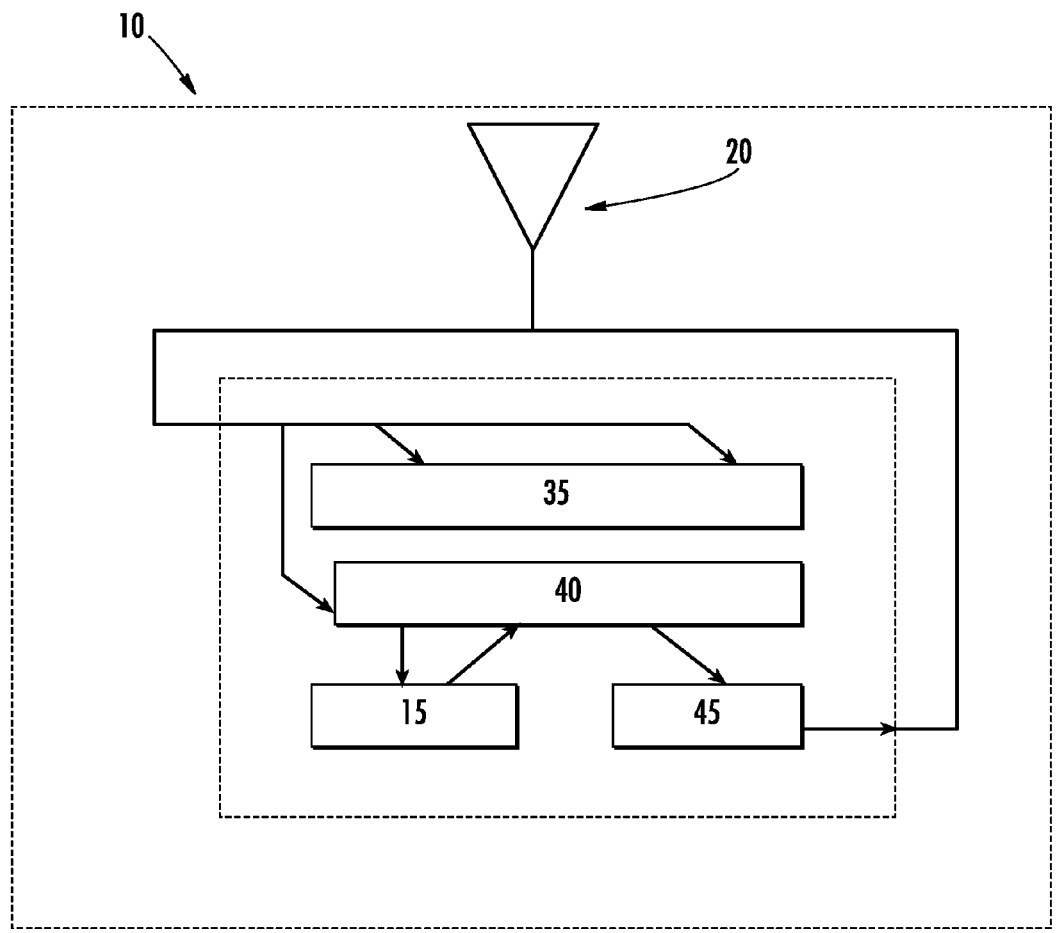
FIG. 2 schematically depicts an NFC tag.

NFC tags are small (e.g., less than 50 millimeters on each side) and thin (e.g., less than 5 mm thick) and easily incorporated within a label or a product. A basic tag, as shown in FIG. 2, includes an antenna for receiving a reader's signal. The antenna is connected to power circuitry 35 for extracting energy and a clock signal from the reader's signal. This power circuitry 35 energizes logic circuitry 40 that accesses the tag's memory 15 to read or write. When read, the information stored in memory is extracted by the logic circuitry and fed to the transmission circuitry 45 that modulates the digital signal onto a radio frequency (i.e., RF) signal. This RF signal is fed to the antenna 20 that broadcasts the signal to the reader. The logic circuitry used in these tags need not be simple. A processor may be used to add capability to the tag. This added performance allows the tags to be used for peer-to-peer NFC communication.

In a simple read/write mode of NFC communication, there is a clear initiator and the communication is primarily a one sided request for information. In peer-to-peer mode, the initiator could be either NFC-enabled device and the communication is two way. The peer-to-peer mode of NFC communication allows for a dialog between the two devices to establish a logical connection and may allow for better security. For example, an NFC device may require credentials from another NFC device before allowing any transfer of data. In addition, encrypted data may be transmitted and require a key to be decoded.

The potential uses of NFC are great. These applications typically configure software settings or launch some application on the reader. Reconfiguring hardware settings on the reader is a new approach and especially important for use with docking stations.

Docking stations provide a simplified and convenient way of connecting an electronic device (e.g., mobile computing device) to a power supply, host computer, or peripheral device. Because of the wide range of dockable devices, each having different connectors, power signaling and uses, docks are not standardized but rather designed with a specific device in mind. An NFC-enabled docking system could provide a means for communicating docking-station information with an NFC-enabled mobile computing device for the purpose of enabling the dock to be used with different mobile computing devices or vice versa.

Figure 3:
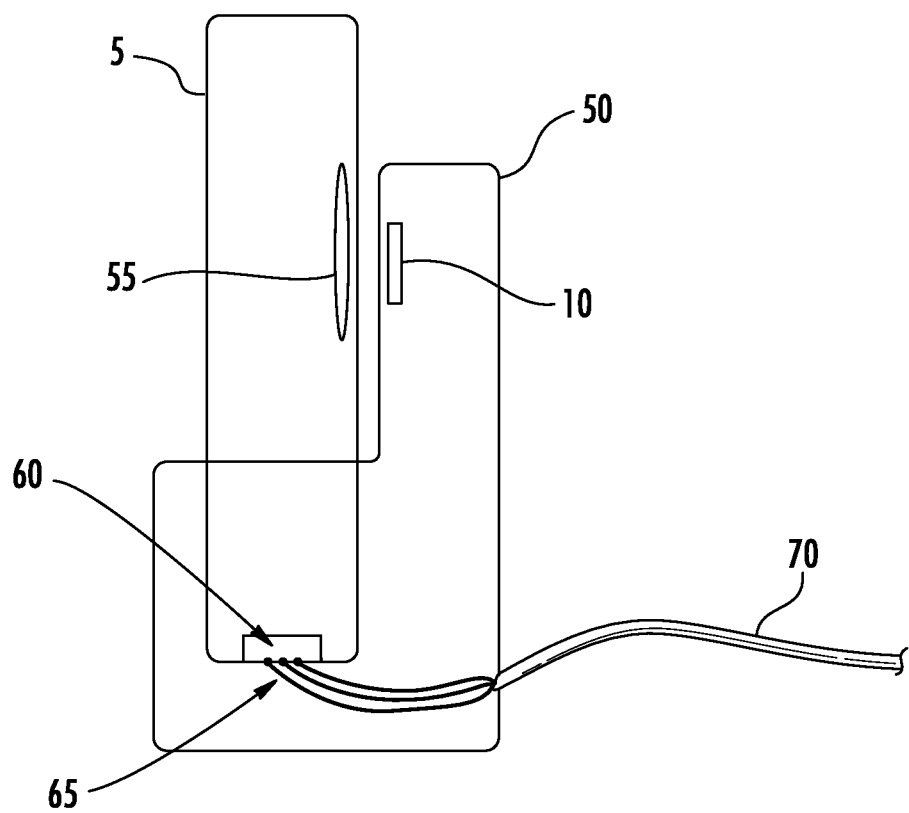
FIG. 3 graphically depicts an exemplary near field communication docking system.

One possible embodiment of the NFC-enabled docking system is shown in FIG. 3. Here an NFC-enabled mobile computing device 5 is inserted into the docking station 50 so that the pins/pads of the mobile device 60 are aligned and touching the pins/pads of the docking connector 65. While a modest number of pins/pads are illustrated in FIG. 3, one of skill in the art will recognize that is but one of many possible embodiments, and other connector configurations, having different pin/pad counts, could be implemented. When docked properly, the NFC antenna 55 of the mobile device is in proximity to the docking station's NFC tag 10. The docking station 50 is connected to a host computer via a cable 70. Using near field communication, the mobile computing device 5 receives docking station information from the docking station's integrated NFC tag 10 in order to configure the docking. The communication commences when the NFC enabled mobile computing device senses a docking condition, indicating that the device has been docked properly. There are various ways to sense a docking condition. For example, if the docking station supplies power to the mobile device upon docking, then it can use the flow of power to detect that a mobile device has been docked. Alternatively, a variety of sensing schemes could be used to sense a docking condition (e.g., electrical connection, magnetic sensor, or accelerometer).

Traditionally, docking connectors have connector configurations (i.e., pin outs) that match the interface connector on the mobile computing device. Depending on the pin out of the various devices, these docking stations could offer one or more of RS-232, USB (host or client), and Ethernet connectivity. Also, some docking stations provide power to the mobile computing devices at certain signal levels on certain pins of the connectors. To accommodate multiple docking stations, a mobile computing device would have to have an interface connector with extra pins in the connector, some that matched one docking station and some that matched another. This would make the interface connector larger, taking up valuable space on the mobile device. By using NFC, a docking station could alert the mobile computing device as to the docking station's connector configuration and the signals to expect on each pin. By using this docking station information, the NFC-enabled mobile computing device could reconfigure its interface connector to physically match the docking connector pin for pin.

Docking station information concerning the signals on each pin could be conveyed. This information could include voltage and current levels to be expected for charging. Also the type of communication (e.g., RS-232, USB, audio, network, etc.) used by the docking station and/or a host computer connected to the docking station could be relayed. By using this docking-system information, an NFC-mobile computing device could establish communication (i.e., a communication link) with the docking station and/or the host computer.

Docking station information could be used to establish that the docking station was supplied or approved by the mobile device manufacturer. These docking-station authentication credentials could be required before the NFC-enabled mobile computing device would be willing to communicate with and/or through the docking station. One possible embodiment of this is a docking station using an NFC tag implementing a scheme whereby the tag securely authenticates itself to the NFC-enabled mobile computing device. This communication could be encrypted.

In one embodiment, NFC communication could be initiated when the mobile computing devices senses power at one of its interface connector's pins. Software present on the NFC-enabled mobile computing device would scan for an appropriate NFC tag. If a tag detected, then the mobile computing device would send a key code to unlock the tag. Once unlocked, a valid tag would communicate docking station information to the mobile computing device. Using this information, the mobile computer would then configure its docking connectors to match the dock and enable a communication link. If (i) no tag was detected, (ii) the wrong tag was detected, or (iii) the tag did not respond properly to the key code, docking would not be possible.

To supplement the present disclosure, this application incorporates entirely by reference the following commonly assigned patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,819; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,559,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,593,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
International Publication No. 2013/163789;
International Publication No. 2013/173985;
International Publication No. 2014/019130;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0169999;
U.S. Patent Application Publication No. 2011/0202554;
U.S. Patent Application Publication No. 2012/0111946;
U.S. Patent Application Publication No. 2012/0138685;

U.S. Patent Application Publication No. 2012/0168511;
U.S. Patent Application Publication No. 2012/0168512;
U.S. Patent Application Publication No. 2012/0193407;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292474;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0306734;
U.S. Patent Application Publication No. 2013/0307964;
U.S. Patent Application Publication No. 2013/0313324;
U.S. Patent Application Publication No. 2013/0313325;
U.S. Patent Application Publication No. 2013/0313326;
U.S. Patent Application Publication No. 2013/0327834;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0021256;
U.S. Patent Application Publication No. 2014/0025584;
U.S. Patent Application Publication No. 2014/0027518;
U.S. Patent Application Publication No. 2014/0034723;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0061307;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz);
U.S. patent application Ser. No. 13/736,139 for an Electronic Device Enclosure, filed Jan. 8, 2013 (Chaney);
U.S. patent application Ser. No. 13/750,304 for Measuring Object Dimensions Using Mobile Computer, filed Jan. 25, 2013;
U.S. patent application Ser. No. 13/771,508 for an Optical Redirection Adapter, filed Feb. 20, 2013 (Anderson);
U.S. patent application Ser. No. 13/780,158 for a Distraction Avoidance System, filed Feb. 28, 2013 (Sauerwein);
U.S. patent application Ser. No. 13/780,196 for Android Bound Service Camera Initialization, filed Feb. 28, 2013 (Todeschini et al.);
U.S. patent application Ser. No. 13/780,271 for a Vehicle Computer System with Transparent Display, filed Feb. 28, 2013 (Fitch et al.);
U.S. patent application Ser. No. 13/780,356 for a Mobile Device Having Object-Identification Interface, filed Feb. 28, 2013 (Samek et al.);
U.S. patent application Ser. No. 13/784,933 for an Integrated Dimensioning and Weighing System, filed Mar. 5, 2013 (McCloskey et al.);
U.S. patent application Ser. No. 13/785,177 for a Dimensioning System, filed Mar. 5, 2013 (McCloskey et al.);
U.S. patent application Ser. No. 13/792,322 for a Replaceable Connector, filed Mar. 11, 2013 (Skvoretz);
U.S. patent application Ser. No. 13/852,097 for a System and Method for Capturing and Preserving Vehicle Event Data, filed Mar. 28, 2013 (Barker et al.);
U.S. patent application Ser. No. 13/895,846 for a Method of Programming a Symbol Reading System, filed Apr. 10, 2013 (Corcoran);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 13/933,415 for an Electronic Device Case, filed Jul. 2, 2013 (London et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 13/974,374 for Authenticating Parcel Consignees with Indicia Decoding Devices, filed Aug. 23, 2013 (Ye et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 14/047,896 for Terminal Having Illumination and Exposure Control filed Oct. 7, 2013 (Jovanovski et al.);

U.S. patent application Ser. No. 14/035,474 for Augmented-Reality Signature Capture, filed Sep. 24, 2013 (Todeschini);

U.S. patent application Ser. No. 14/050,515 for Hybrid-Type Bioptical, filed Oct. 10, 2013 (Edmonds et al.);

U.S. patent application Ser. No. 14/053,175 for Imaging Apparatus Having Imaging Assembly, filed Oct. 14, 2013 (Barber) U.S. patent application Ser. No. 14/055,234 for Dimensioning System, filed Oct. 16, 2013 (Fletcher);

U.S. patent application Ser. No. 14/055,353 for Dimensioning System, filed Oct. 16, 2013 (Giordano et al.);

U.S. patent application Ser. No. 14/055,383 for Dimensioning System, filed Oct. 16, 2013 (Li et al.);

U.S. patent application Ser. No. 14/053,314 for Indicia Reader, filed Oct. 14, 2013 (Huck);

U.S. patent application Ser. No. 14/058,762 for Terminal Including Imaging Assembly, filed Oct. 21, 2013 (Gomez et al.);

U.S. patent application Ser. No. 14/062,239 for Chip on Board Based Highly Integrated Imager, filed Oct. 24, 2013 (Toa et al.);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/082,468 for Encoded Information Reading Terminal with Wireless Path Selection Capability, filed Nov. 18, 2013 (Wang et al.);

U.S. patent application Ser. No. 14/087,190 for Optimal Range Indicators for Bar Code Validation, filed Nov. 22, 2013 (Hejl); U.S. patent application Ser. No. 14/093,484 for System for Capturing a Document in an Image Signal, filed Dec. 1, 2013 (Showering);

U.S. patent application Ser. No. 14/093,487 for Method and System Operative to Process Color Image Data, filed Dec. 1, 2013 (Li et al.);

U.S. patent application Ser. No. 14/093,490 for Imaging Terminal Having Image Sensor and Lens Assembly, filed Dec. 1, 2013 (Havens et al.);

U.S. patent application Ser. No. 14/093,624 for Apparatus Operative for Capture of Image Data, filed Dec. 2, 2013 (Havens et al.);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/107,048 for Roaming Encoded Information Reading Terminal, filed Dec. 16, 2013 (Wang et al.);

U.S. patent application Ser. No. 14/118,400 for Indicia Decoding Device with Security Lock, filed Nov. 18, 2013 (Liu);

U.S. patent application Ser. No. 14/138,206 for System and Method to Store and Retrieve Indentifier Associated Information, filed Dec. 23, 2013 (Gomez et al.);

U.S. patent application Ser. No. 14/143,399 for Device Management Using Virtual Interfaces, filed Dec. 30, 2013 (Caballero);

U.S. patent application Ser. No. 14/147,992 for Decoding Utilizing Image Data, filed Jan. 6, 2014 (Meier et al.);

U.S. patent application Ser. No. 14/150,393 for Incicia-reader Having Unitary Construction Scanner, filed Jan. 8, 2014 (Colavito et al.);

U.S. patent application Ser. No. 14/153,111 for Indicia Reading Terminal Including Frame Quality Evaluation Processing, filed Jan. 13, 2014 (Wang et al.);

U.S. patent application Ser. No. 14/153,142 for Imaging Apparatus Comprising Image Sensor Array having Shared Global Shutter Circuitry, filed Jan. 13, 2014 (Wang);

U.S. patent application Ser. No. 14/153,182 for System and Method to Manipulate an Image, filed Jan. 13, 2014 (Longacre et al.);

U.S. patent application Ser. No. 14/153,213 for Apparatus Comprising Image Sensor Array and Illumination Control, filed Jan. 13, 2014 (Ding);

U.S. patent application Ser. No. 14/153,249 for Terminal Operative for Storing Frame of Image Data, filed Jan. 13, 2014 (Winegar);

U.S. patent application Ser. No. 14/154,207 for Laser Barcode Scanner, filed Jan. 14, 2014 (Hou et al.);

U.S. patent application Ser. No. 14/154,915 for Laser Scanning Module Employing a Laser Scanning Assembly having Elastomeric Wheel Hinges, filed Jan. 14, 2014 (Havens et al.);

U.S. patent application Ser. No. 14/158,126 for Methods and Apparatus to Change a Feature Set on Data Collection Devices, filed Jan. 17, 2014 (Berthiaume et al.);

U.S. patent application Ser. No. 14/159,074 for Wireless Mesh Point Portable Data Terminal, filed Jan. 20, 2014 (Wang et al.);

U.S. patent application Ser. No. 14/159,509 for MMS Text Messaging for Hand Held Indicia Reader, filed Jan. 21, 2014 (Kearney);

U.S. patent application Ser. No. 14/159,603 for Decodable Indicia Reading Terminal with Optical Filter, filed Jan. 21, 2014 (Ding et al.);

U.S. patent application Ser. No. 14/160,645 for Decodable Indicia Reading Terminal with Indicia Analysis Functionality, filed Jan. 22, 2014 (Nahill et al.);

U.S. patent application Ser. No. 14/161,875 for System and Method to Automatically Discriminate Between Different Data Types, filed Jan. 23, 2014 (Wang);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/176,417 for Devices and Methods Employing Dual Target Auto Exposure filed Feb. 10, 2014 (Meier et al.);

U.S. patent application Ser. No. 14/187,485 for Indicia Reading Terminal with Color Frame Processing filed Feb. 24, 2014 (Ren et al.);

U.S. patent application Ser. No. 14/200,405 for Indicia Reader for Size-Limited Applications filed Mar. 7, 2014 (Feng et al.);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/342,551 for Terminal Having Image Data Format Conversion filed Mar. 4, 2014 (Lui et al.);

U.S. patent application Ser. No. 14/345,735 for Optical Indicia Reading Terminal with Combined Illumination filed Mar. 19, 2014 (Ouyang)

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for docking an NFC-enabled mobile computing device with an NFC-enabled docking station, the method comprising:
    placing an NFC-enabled mobile computing device in proximity to an NFC-enabled docking station;
    transferring docking-station information from the NFC-enabled docking station to the NFC-enabled mobile computing device using NFC communication, wherein the docking station information comprises the docking station's connector configuration and the signals to expect on each pin;
    reconfiguring the NFC-enabled mobile computing device's interface connector pins to electrically match the NFC-enabled docking station connector's configuration based on the received docking-station information; and
    connecting an interface connector on the NFC-enabled mobile computing device with a docking connector on the NFC-enabled docking station.

2. The method according to claim 1, wherein the NFC-enabled docking station comprises an NFC tag that is scanned by the NFC-enabled mobile computing device to transfer the docking-station information.

3. The method according to claim 1, wherein the docking-station information configures the NFC-enabled mobile computing device to establish a communication link with the NFC-enabled docking station.

4. The method according to claim 1, wherein the docking-station information configures the NFC-enabled mobile computing device to establish a communication link with a host computer connected to the NFC-enabled docking station.

5. The method according to claim 1, wherein the docking-station information configures the NFC-enabled mobile computing device to establish a communication link with the NFC-enabled docking station and a host computer connected to the NFC-enabled docking station.

6. The method according to claim 1, wherein the step of transferring docking-station information is initiated when the NFC-enabled mobile computing device detects a docking condition.

7. The method according to claim 1, wherein the docking-station information includes docking-station authentication credentials.

8. The method according to claim 7, comprising the step of using the docking-station authentication credentials to establish a communication link between the NFC-enabled mobile computing device and the NFC-enabled docking station and/or a host computer connected to the NFC-enabled docking station.

9. A near field communication docking system, comprising:
    an NFC-enabled mobile computing device;
    an NFC-enabled docking station having docking-station information and configured to transfer the docking-station information to the NFC-enabled mobile computing device using NFC communication;
    wherein the NFC-enabled docking system uses the docking-station information to configure the NFC-enabled mobile computing device when the NFC-enabled mobile computing device is positioned in proximity to the NFC-enabled docking station;
    wherein the docking station information comprises the docking station's connector configuration and the signals to expect on each pin; and
    wherein the NFC-enabled mobile computing device reconfigures its interface connector pins to electrically match the NFC-enabled docking station connector's configuration.

10. The near field communication docking system according to claim 9, wherein the NFC-enabled docking station includes an NFC tag that facilitates the transfer of the docking-station information from the NFC-enabled docking station to the NFC-enabled mobile computing device.

11. The near field communication docking system according to claim 9, wherein the near field communication docking system uses the docking-station information to configure the NFC-enabled mobile computing device to establish a communication link with the NFC-enabled docking station.

12. The near field communication docking system according to claim 9, wherein the near field communication docking system uses the docking-station information to configure the NFC-enabled mobile computing device to establish a communication link with a host computer connected to the NFC-enabled docking station.

13. The near field communication docking system according to claim 9, wherein the near field communication docking system uses the docking-station information to configure the NFC-enabled mobile computing device to establish a communication link with the NFC-enabled docking station and a host computer connected to the NFC-enabled docking station.

14. The near field communication docking system according to claim 9, wherein the NFC-enabled mobile computing device is configured to acquire information from the NFC-enabled docking station when the NFC-enabled mobile computing device detects a docking condition.

15. The near field communication docking system according to claim 9, wherein the docking-station information includes docking station authentication credentials.

16. The near field communication docking system according to claim 15, wherein the near field communication docking system uses the docking station authentication credentials to establish a communication link between the NFC-enabled mobile computing device and the NFC-enabled docking station and/or a host computer connected to the NFC-enabled docking station.

17. The near field communication docking system according to claim 9, wherein the NFC-enabled mobile computing device is configured to provide a key code to the NFC-enabled docking station in order to initiate transfer of the docking-station information from the NFC-enabled docking station to the NFC-enabled mobile computing device.

18. The near field communication docking system according to claim 9, wherein the near field communication docking system uses encrypted docking-station information to configure the NFC-enabled mobile computing device.

* * * * *